US008733397B2

(12) United States Patent
Otsuka et al.

(10) Patent No.: US 8,733,397 B2
(45) Date of Patent: May 27, 2014

(54) ELECTROMAGNETICALLY ACTUATED VALVE

(71) Applicant: Hitachi Automative Systems, Ltd., Hitachinaka (JP)

(72) Inventors: Yukinori Otsuka, Atsugi (JP); Yohei Sato, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/668,851

(22) Filed: Nov. 5, 2012

(65) Prior Publication Data

US 2013/0056662 A1 Mar. 7, 2013

Related U.S. Application Data

(63) Continuation of application No. 12/649,905, filed on Dec. 30, 2009, now Pat. No. 8,322,684.

(30) Foreign Application Priority Data

Mar. 24, 2009 (JP) ................................ 2009-072350

(51) Int. Cl.
*F16K 11/16* (2006.01)
(52) U.S. Cl.
USPC ............... 137/630.16; 251/129.15; 303/119.2
(58) Field of Classification Search
USPC .................. 137/129.01, 129.15, 129.19, 630, 137/630.16, 614.16; 303/119.2; 251/129.01, 129.15, 129.19
See application file for complete search history.

(56) References Cited

U.S. PATENT DOCUMENTS

| 4,452,424 | A | * | 6/1984 | Kawata ..................... 251/129.15 |
| 4,679,592 | A | * | 7/1987 | Lamb ....................... 137/625.33 |
| 5,333,836 | A | | 8/1994 | Fukuyo et al. |
| 5,647,644 | A | * | 7/1997 | Volz et al. ................. 303/119.2 |
| 5,865,213 | A | * | 2/1999 | Scheffel et al. .......... 137/614.16 |
| 6,254,200 | B1 | | 7/2001 | Ganzel |
| 6,627,077 | B2 | | 9/2003 | Fritsch et al. |
| 6,637,724 | B1 | | 10/2003 | Mayer |
| 6,755,390 | B2 | * | 6/2004 | Masuda et al. ............. 251/30.03 |
| 6,789,779 | B2 | | 9/2004 | Wilde et al. |
| 6,846,408 | B2 | | 1/2005 | Knight |
| 7,108,242 | B2 | | 9/2006 | Goossens et al. |
| 7,240,893 | B2 | * | 7/2007 | Komaba et al. .......... 251/129.04 |
| 7,341,320 | B2 | | 3/2008 | Otsuka et al. |
| 7,452,192 | B2 | | 11/2008 | Hirota |
| 7,866,627 | B2 | | 1/2011 | Ohi et al. |

(Continued)

FOREIGN PATENT DOCUMENTS

JP 2002-539016 T 11/2002
WO WO 00/53474 A1 9/2000

*Primary Examiner* — John K Fristoe, Jr.
*Assistant Examiner* — R. K. Arundale
(74) *Attorney, Agent, or Firm* — Foley & Lardner LLP

(57) ABSTRACT

An electromagnetically actuated valve including a solenoid with a coil that generates a magnetic field upon being energized, a tubular member made of a non-magnetic material and disposed on an inner circumferential side of the coil, a movable valve body disposed within the tubular member and movable in an axial direction of the tubular member by an attraction force that is generated upon energizing the coil to thereby open and close a fluid passage, a first member made of a resin material and including a seat portion that is brought into contact with the movable valve body to close the fluid passage, and a first biasing member that biases the movable valve body toward the seat portion.

4 Claims, 6 Drawing Sheets

(56) References Cited

U.S. PATENT DOCUMENTS

| | | |
|---|---|---|
| 2002/0100890 A1 | 8/2002 | Moreno et al. |
| 2002/0145125 A1 | 10/2002 | Tomoda et al. |
| 2003/0024580 A1* | 2/2003 | Bohaychuk .............. 137/625.37 |
| 2003/0151018 A1* | 8/2003 | Teshima et al. ............... 251/332 |
| 2005/0029478 A1 | 2/2005 | Komaba et al. |
| 2005/0218364 A1* | 10/2005 | Ohi et al. ................. 251/129.15 |
| 2009/0095928 A1* | 4/2009 | Lee et al. ................. 251/129.15 |
| 2009/0121541 A1* | 5/2009 | Lee et al. .................... 303/119.2 |

* cited by examiner

US 8,733,397 B2

ELECTROMAGNETICALLY ACTUATED VALVE

CROSS-REFERENCE TO RELATED APPLICATIONS

This application is a Continuation of U.S. application Ser. No. 12/649,905, filed Dec. 30, 2009, and claims the benefit of priority from prior Japanese Patent Application No. 2009-072350, filed Mar. 24, 2009, and the entire contents of each of these applications are incorporated herein by reference.

BACKGROUND OF THE INVENTION

The present invention relates to an electromagnetically actuated valve adapted to open and close a fluid passage.

Japanese Patent Application Publication No. 2002-539016 (T) (corresponding to PCT International Application Publication No. WO00/53474 (A1)) discloses an electromagnetically actuated valve including a seat member that is formed by pressing a thin plate.

SUMMARY OF THE INVENTION

In the above-described conventional art, the presswork for forming the seat member necessitates high cost due to a complicated shape of the seat member.

The present invention has been made in view of the above-described problem. It is an object of the present invention to provide an electromagnetically actuated valve that can be produced at a reduced cost.

The other objects and features of this invention will become understood from the following description with reference to the accompanying drawings.

In one aspect of the present invention, there is provided an electromagnetically actuated valve, comprising:
a solenoid including a coil that generates a magnetic field upon being energized;
a tubular member made of a non-magnetic material and disposed on an inner circumferential side of the coil;
a movable valve body disposed within the tubular member and movable in an axial direction of the tubular member by an attraction force that is generated upon energizing the coil to thereby open and close a fluid passage;
a first member that is made of a resin material and includes a seat portion that is brought into contact with the movable valve body to close the fluid passage; and
a first biasing member that biases the movable valve body toward the seat portion.

In a further aspect of the present invention, there is provided an electromagnetically actuated valve, comprising:
a solenoid including a coil that generates a magnetic field upon being energized;
a tubular member made of a non-magnetic material and disposed on an inner circumferential side of the coil;
a stationary core disposed on one axial open end portion of the tubular member;
a movable valve body made of a magnetic material and disposed within the tubular member, the movable valve body being movable in an axial direction of the tubular member by an attraction force that is generated upon energizing the coil to thereby open and close a fluid passage,
a cup-shaped first member made of a resin material and integrally fixed to the other axial open end portion of the tubular member, the first member including a seat portion that is brought into contact with the movable valve body to close the fluid passage, and an outer annular wall; and a first biasing member that biases the movable valve body toward the seat portion.

In a still further aspect of the present invention, there is provided an electromagnetically actuated valve, comprising:
a solenoid including a coil that generates a magnetic field upon being energized;
a thin-walled tubular member made of a non-magnetic material and disposed on an inner circumferential side of the coil;
a stationary core disposed on one axial open end portion of the tubular member;
a movable valve body made of a magnetic material and movable within the tubular member in an axial direction of the tubular member by an attraction force that is generated upon energizing the coil to thereby open and close a fluid passage;
a cup-shaped first member made of a resin material which has a wall thickness larger than the tubular member, the first member including a seat portion that is brought into contact with the movable valve body to close the fluid passage, and an outer annular wall in which the other axial open end portion of the tubular member is integrally molded, and
a first coil spring that is disposed between the stationary core and the movable valve body in a compressed state and biases the movable valve body toward the seat portion.

DETAILED DESCRIPTION OF THE INVENTION

Referring to FIG. 1 to FIG. 5, an electromagnetically actuated valve according to a first embodiment of the present invention now is explained. In this embodiment, the electromagnetically actuated valve is used as a normally closed type on-off valve in a brake system for a vehicle. First, a hydraulic circuit construction of the brake system is explained.

[Construction of Hydraulic circuit of Brake System]

Figure 1:
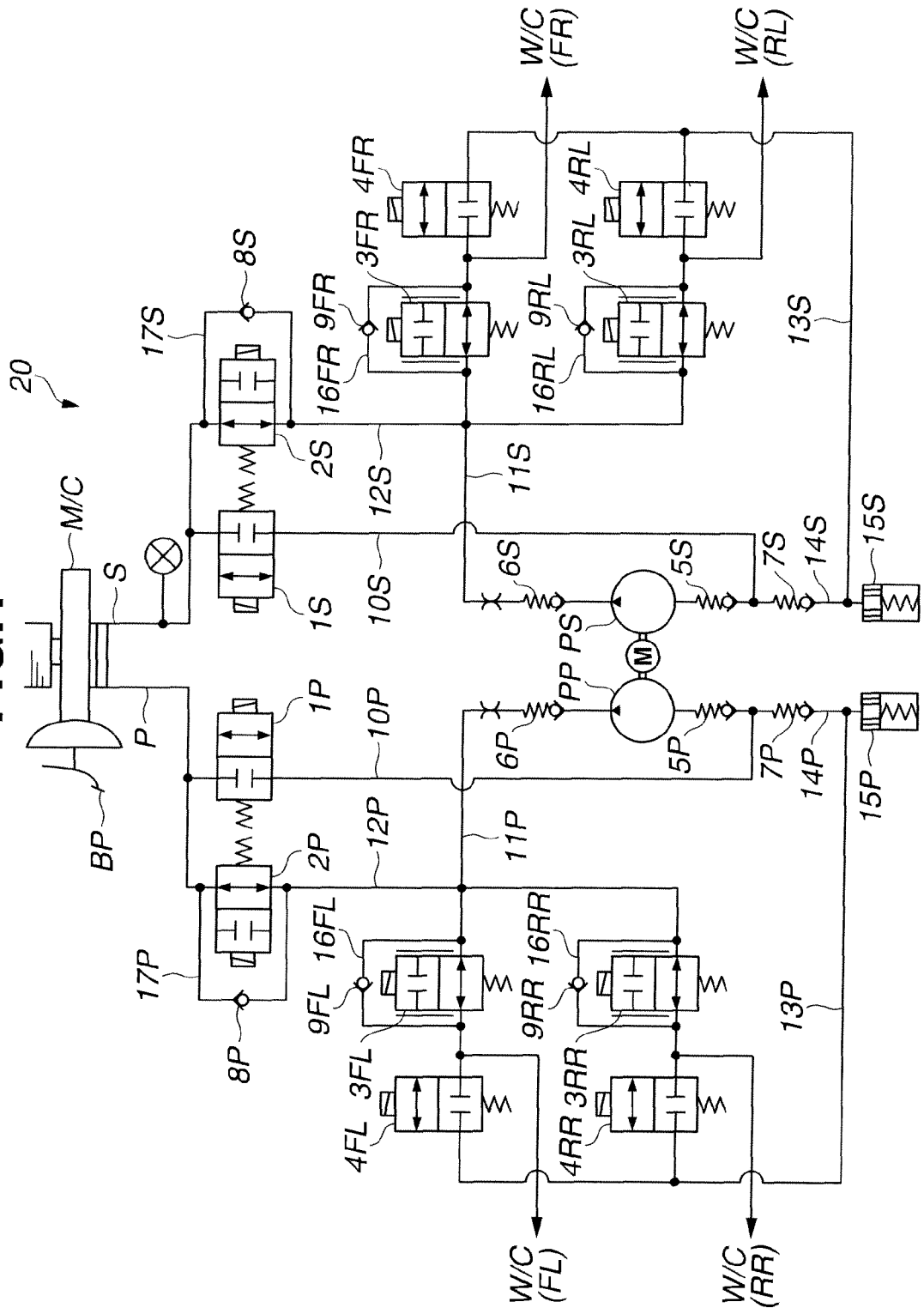
FIG. 1 is a hydraulic circuit diagram of a brake system to which an electromagnetically actuated valve according to the present invention is applicable.

FIG. 1 is a hydraulic circuit diagram of brake system 20 to which an electromagnetically actuated valve according to the present invention is applicable. As shown in FIG. 1, brake system 20 has a piping construction, i.e., so-called X piping including two systems constituted of P system and S system. Wheel cylinder W/C(FL) for a left front wheel and wheel cylinder W/C(RR) for a right rear wheel are connected to P system. Wheel cylinder W/C(FR) for a right front wheel and wheel cylinder W/C(FL) for a left rear wheel are connected to S system. Pump PP and pump PS are provided in P system and S system, respectively, and driven by single motor M.

Master cylinder M/C is connected with suction sides of pumps PP, PS through fluid passages 10P, 10S, respectively. Inflow gate valves 1P, 1S which are normally closed type on-off valves are disposed on fluid passages 10P, 10S, respectively. Check valve 5P is disposed between inflow gate valve 1P and pump PP on fluid passage 10P. Check valve 5P allows a flow of brake fluid in a direction from inflow gate valve 1P toward pump PP and inhibits a flow of brake fluid in a reverse direction from pump PP toward inflow gate valve 1P. Check valve 5S is disposed between inflow gate valve 1S and pump PS on fluid passage 10S. Check valve 5S allows a flow of brake fluid in a direction from inflow gate valve 1S toward pump PS and inhibits a flow of brake fluid in a reverse direction from pump PS toward inflow gate valve 1S.

A discharge side of pump PP is connected to wheel cylinders W/C(FL), W/C(RR) through fluid passage 11P. A discharge side of pump PS is connected to wheel cylinders W/C(FR), W/C(RL) through fluid passage 11S. Pressure increasing valves 3FL, 3RR corresponding to wheel cylinders W/C(FL), W/C(RR) are disposed on fluid passages 11P. Pressure increasing valves 3FR, 3RL corresponding to wheel cylinders W/C(FR), W/C(RL) are disposed on fluid passages 11S. Each of pressure increasing valves 3FL, 3RR, 3FR and 3RL is a proportioning valve of a normally open type. Check valve 6P is disposed between pump PP and pressure increasing valves 3FL, 3RR on fluid passage 11P. Check valve 6P allows a flow of brake fluid in a direction from pump PP toward pressure increasing valves 3FL, 3RR and inhibits a flow of brake fluid in a reverse direction from pressure increasing valves 3FL, 3RR toward pump PP. Check valve 6S is disposed between pump PS and pressure increasing valves 3FR, 3RL on fluid passage 11S. Check valve 6S allows a flow of brake fluid in a direction from pump PS toward pressure increasing valves 3FR, 3RL and inhibits a flow of brake fluid in a reverse direction from pressure increasing valves 3FR, 3RL toward pump PS.

Fluid passage 11P includes bypass passages 16FL, 16RR which bypass pressure increasing valves 3FL, 3RR, respectively. Check valves 9FL, 9RR are disposed on bypass passages 16FL, 16RR, respectively. Check valves 9FL, 9RR allow a flow of brake fluid in a direction from wheel cylinders W/C(FL), W/C(RR) toward pump PP and inhibit a flow of brake fluid in a reverse direction from pump PP toward wheel cylinders W/C(FL), W/C(RR). Fluid passage 11S includes bypass passages 16FR, 16RL which bypass pressure increasing valves 3FR, 3RL, respectively. Check valves 9FR, 9RL are disposed on bypass passages 16FR, 16RL, respectively. Check valves 9FR, 9RL allow a flow of brake fluid in a direction from wheel cylinders W/C(FR), W/C(RL) toward pump PS and inhibit a flow of brake fluid in a reverse direction from pump PS toward wheel cylinders W/C(FR), W/C(RL).

Master cylinder M/C is connected with fluid passages 11P, 11S through fluid passages 12P, 12S, respectively. Fluid passage 11P is merged with fluid passage 12P between pump PP and pressure increasing valves 3FL, 3RR. Fluid passage 11S is merged with fluid passage 12S between pump PS and pressure increasing valves 3FR, 3RL. Outflow gate valves 2P, 2S are disposed on fluid passages 12P, 12S, respectively. Each of outflow gate valves 2P, 2S is a normally open type on-off valve. Fluid passages 12P, 12S include bypass passages 17P, 17S which bypass outflow gate valves 2P, 2S, respectively. Check valves 8P, 8S are disposed on bypass passages 17P, 17S, respectively. Check valve 8P allows a flow of brake fluid in a direction from master cylinder M/C toward wheel cylinders W/C(FL), W/C(RR) and inhibits a flow of brake fluid in a reverse direction from wheel cylinders W/C(FL), W/C(RR) toward master cylinder M/C. Check valve 8S allows a flow of brake fluid in a direction from master cylinder M/C toward wheel cylinders W/C(FR), W/C(RL) and inhibits a flow of brake fluid in a reverse direction from wheel cylinders W/C(FR), W/C(RL) toward master cylinder M/C.

Reservoirs 15P, 15S are connected with the suction sides of pumps PP, PS through fluid passages 14P, 14S, respectively. Check valve 7P is disposed between reservoir 15P and pump PP on fluid passage 14P. Check valve 7P allows a flow of brake fluid in a direction from reservoir 15P toward pump PP and inhibits a flow of brake fluid in a reverse direction from pump PP toward reservoir 15P. Check valve 7S is disposed between reservoir 15S and pump PS on fluid passage 14S. Check valve 7S allows a flow of brake fluid in a direction from reservoir 15S toward pump PS and inhibits a flow of brake fluid in a reverse direction from pump PS toward reservoir 15S.

Wheel cylinders W/C(FL), W/C(RR) are connected with fluid passage 14P through fluid passage 13P. Fluid passage 13P and fluid passage 14P are merged with each other between check valve 7P and reservoir 15P. Pressure reducing valves 4FL, 4RR each being a normally closed type on-off valve are disposed on fluid passage 13P. Wheel cylinders W/C(FR), W/C(RL) are connected with fluid passage 14S through fluid passage 13S. Fluid passage 13S and fluid passage 14S are merged with each other between check valve 7S and reservoir 15S. Pressure reducing valves 4FR, 4RL each being a normally closed type on-off valve are disposed on fluid passage 13S.

[Construction of Electromagnetically Actuated Valve]

Figure 2:
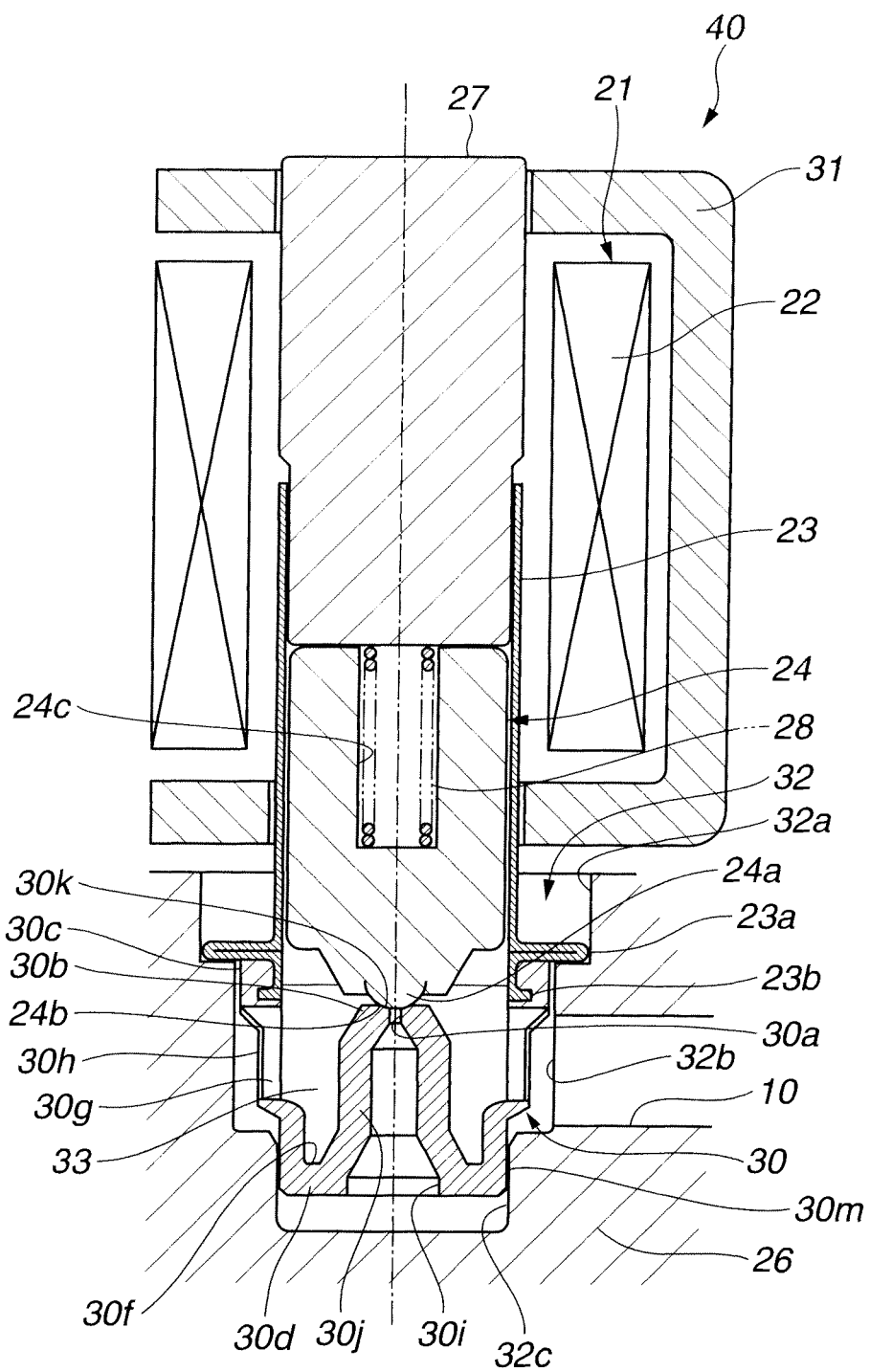
FIG. 2 is a cross section of the electromagnetically actuated valve according to a first embodiment, taken along an axis of the electromagnetically actuated valve.
Figure 3:
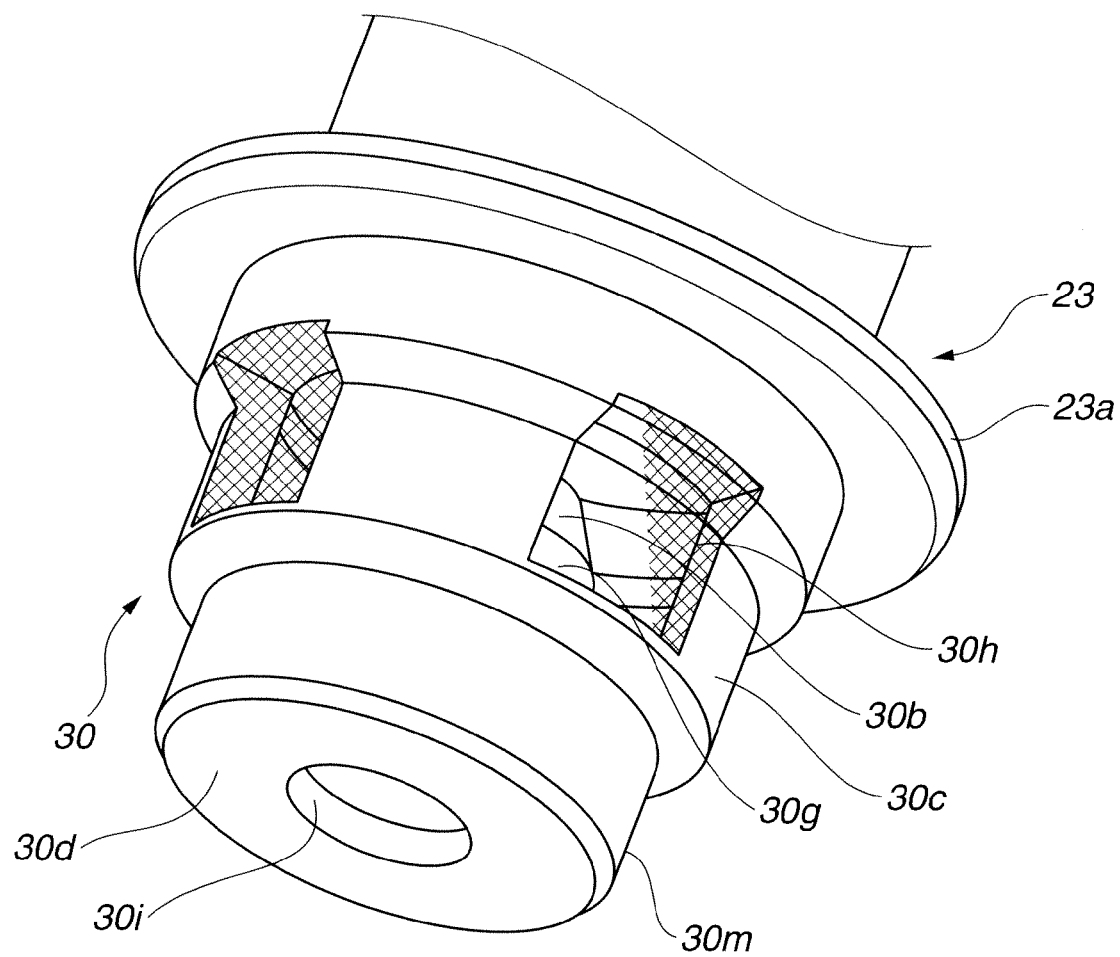
FIG. 3 is a perspective view of a first member (i.e., a cup-shaped member) and a valve case of the electromagnetically actuated valve according to the first embodiment.
Figure 4:
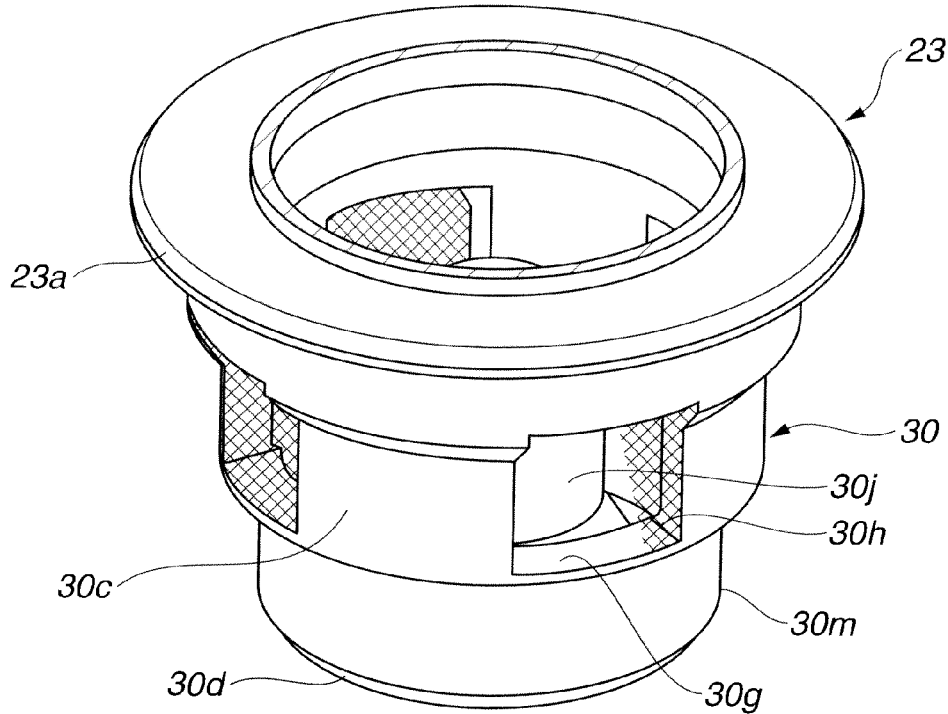
FIG. 4 is a perspective view of the first member and the valve case of the electromagnetically actuated valve according to the first embodiment, viewed from an angle different from that in FIG. 3.
Figure 5:
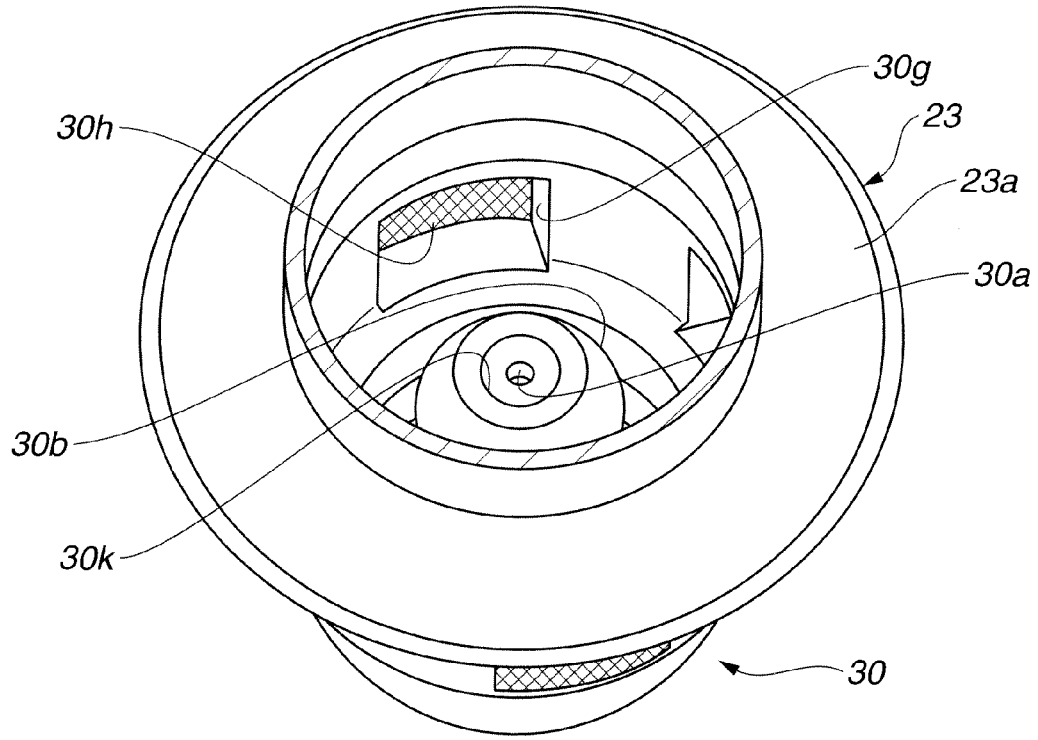
FIG. 5 is a perspective view of the first member and the valve case of the electromagnetically actuated valve according to the first embodiment, viewed from an angle different from those in FIG. 3 and FIG. 4.

Referring to FIG. 2 to FIG. 5, a construction of electromagnetically actuated valve 40 of a first embodiment is explained. FIG. 2 is a cross section of electromagnetically actuated valve 40 of a normally closed type. FIG. 3 to FIG. 5 are perspective views of resin member 30 and valve case 23 which are components of electromagnetically actuated valve 40.

As shown in FIG. 2, electromagnetically actuated valve 40 is mounted into valve mounting hole 32 formed in housing 26 (i.e., a mount member for electromagnetically actuated valve 40).

Electromagnetically actuated valve 40 includes solenoid 21 adapted to generate an electromagnetic force upon being energized, stationary core 27 made of a magnetic material, armature 24 (i.e., a movable core or a movable valve body) that is driven by the electromagnetic force, hollow cylindrical valve case 23 (i.e., a thin-walled tubular member) which serves as a cylinder for armature 24, and resin member 30 having orifice 30a that is opened and closed by plunger 24a of armature 24.

Solenoid 21 with coil 22 wound thereon is mounted to yoke 31. Stationary core 27 has a generally cylindrical magnetic body made of iron. Valve case 23 is formed into a generally tubular shape and made of a non-magnetic material. Valve case 23 has axial open end portions which are opposed to each other in an axial direction of valve case 23. One of the axial open end portions of valve case 23 is bent in a radially outward direction of valve case 23 to thereby form flange portion 23b. Protrudent portion 23a is provided on a side of the one axial open end portion of valve case 23. Protrudent portion 23a is formed by a fold extending in the radially outward direction of valve case 23. Armature 24 has spring inserting hole 24c on one axial end portion thereof and spherical plunger 24a on the other axial end portion thereof. A spherical surface of plunger 24a forms engaging surface 24b that is brought into engagement with contact portion 30b of resin member 30 as explained later. Coil spring 28 is disposed in spring inserting hole 24c of armature 24 and serves as a first biasing member that biases armature 24 toward resin member 30.

Resin member 30 is formed into a generally cup shape with one closed end and includes outer annular wall 30c defining a generally cylindrical outer surface. Resin member 30 further includes inner annular wall 30j that extends from an inner circumferential side of a bottom portion of resin member 30 toward a side of an open axial end of resin member 30. Outer annular wall 30c is formed with suction window (or suction opening) 30g through which an inside and an outside of outer annular wall 30c are communicated with each other. Filter 30h is integrally disposed in suction window 30g. In this embodiment, a plurality of suction windows 30g with filters 30h are disposed in outer annular wall 30c in circumferentially spaced relation to each other as shown in FIG. 3 to FIG. 5. Resin member 30 is formed by casting a resin material into a mold. Resin member 30 may be made of a plastic material. In the molding process, protrudent portion 23b of valve case 23 is placed in the mold for resin member 30 and the resin material is cast into the mold so as to be coupled to an open axial end portion of resin member 30. Thus, protrudent portion 23b of valve case 23 is insert-molded in the open axial end portion of resin member 30. Inner annular wall 30j has a protrudent axial end portion defining contact portion 30b (i.e., a seat portion) of resin member 30 which is brought into contact with plunger 24a of armature 24. Contact portion 30b is formed with orifice 30a through which an inside and an outside of resin member 30 are communicated with each other. Orifice 30a extends in an axial direction of resin member 30 and penetrates contact portion 30b. Orifice 30a is communicated with discharge outlet 30i that is opened to an outer surface of the bottom portion of resin member 30. Further, contact portion 30b is formed with annular engaging surface 30k that is brought into contact with the spherical surface of plunger 24a of armature 24. Engaging surface 30k is inclined relative to an axis of resin member 30 so as to be recessed from a radial outside of engaging surface 30k toward orifice 30a. Inner annular wall 30j and outer annular wall 30c are connected with each other through connecting wall 30d. Outer annular wall 30c, connecting wall 30d and inner annular wall 30j cooperate with each other to form the bottom portion of resin member 30 which has a generally U-shaped section. Connecting wall 30d defines inner bottom surface 30f of resin member 30. Further, inner annular wall 30j, outer annular wall 30c and connecting wall 30d cooperate with each other to define fluid passage 33 therebetween which allows the brake fluid to enter from suction windows 30g and flow into orifice 30a. Specifically, fluid passage 33 is a space that is formed by an inner circumferential surface of outer annular wall 30c, an outer circumferential surface of inner annular wall 30j and inner bottom surface 30f of connecting wall 30d.

Valve mounting hole 32 is a stepped hole and includes larger diameter portion 32a, intermediate diameter portion 32b and smaller diameter portion 32c which are arranged from a side of the opening of valve mounting hole 32 toward an inside of valve housing 26. Fluid passage 10 formed in housing 26 is opened into intermediate diameter portion 32b of valve mounting hole 32. Another fluid passage, not shown, is also opened into smaller diameter portion 32c of valve mounting hole 32.

[Assembly of Electromagnetically Actuated Valve]
First, armature 24 is inserted into valve case 23 integrally formed with resin member 30 from the one end of valve case 23. Coil spring 28 is inserted into spring inserting hole 24c of armature 24. Subsequently, stationary core 27 is inserted into valve case 23 through the other open end of valve case 23, and then secured to valve case 23 by welding. As a result, coil spring 28 is disposed between stationary core 27 and armature 24. Stationary core 27, therefore, is inserted into valve case 23 against a biasing force of coil spring 28. That is, coil spring 28 is kept in a compressed state under a condition that stationary core 27 is secured to valve case 23.

The assembled body constituted of valve case 23 with resin member 30, armature 24, coil spring 28 and stationary core 27 is inserted into valve mounting hole 32. At this time, outer annular wall 30c of resin member 30 is press-fitted into smaller diameter portion 32c of valve mounting hole 32. Specifically, press-fit surface 30m of outer annular wall 30c which is located in the vicinity of connecting wall 30d is press-fitted to an inner circumferential surface of smaller diameter portion 32c. In addition, protrudent portion 23a of valve case 23 is brought into contact with a step between larger diameter portion 32a and intermediate diameter portion 32b of valve mounting hole 32. In this state, suction windows 30g of resin member 30 are exposed to intermediate diameter portion 32b, and discharge outlet 30i of resin member 30 is exposed to smaller diameter portion 32c. After that, solenoid 21 is mounted to the assembled body together with yoke 31.

[Operation of Electromagnetically Actuated Valve]
A brake fluid is supplied from suction windows 30g formed in outer annular wall 30c of resin member 30 into the space between the inner circumferential surface of outer annular wall 30c and the outer circumferential surface of inner annular wall 30j. In a case where solenoid 21 is in the deenergized state, engaging surface 24b of plunger 24a is kept in contact with engaging surface 30k of contact portion 30b of resin member 30 by the biasing force of coil spring 28 so that orifice 30a is held in the closed state. When solenoid 21 is energized, armature 24 is magnetically attracted and moved toward a side of stationary core 27 so that engaging surface 24b of plunger 24a is moved apart from engaging surface 30k of contact portion 30b of resin member 30 to thereby open orifice 30a.

[Function]
In general, an electromagnetically actuated valve necessitates a suction window for sucking brake fluid, a contact portion that comes into contact with a plunger of an armature, an orifice formed in the contact portion, a discharge outlet from which the brake fluid is discharged through the orifice, and a fluid passage extending from the suction window to the orifice. In a case where these necessary parts are provided in one member, the member must be formed into a complicated shape. Therefore, if the member is formed by metal presswork, many processes in the presswork will be necessitated. Although the electromagnetically actuated valve may be formed using a plurality of parts, it is necessary to ensure sealability between the suction side and discharge side of the electromagnetically actuated valve, and therefore, provide an increased press-fit allowance.

In view of the above-described problems in the conventional art, electromagnetically actuated valve 40 according to the first embodiment is provided with resin member 30 having contact portion 30b that is brought into contact with armature 24 to close orifice 30a. A resin material used as a material of resin member 30 can be readily formed into a relatively complicated shape by molding. As a result, even resin member 30 having a complicated shape can be formed by molding through a small number of steps. Further, since resin member 30 is formed as a single part, it is not necessary to consider sealability of resin member 30, and therefore, provision of the press-fit allowance is not needed.

Further, in electromagnetically actuated valve 40 according to the first embodiment, resin member 30 is formed into a cup shape including outer annular wall 30c disposed on a radial outside of contact portion 30b, and connecting wall 30d that connects contact portion 30b and outer annular wall 30c and forms a bottom portion of cup-shaped resin member 30. With this construction, an inside space of cup-shaped resin member 30 can be used as fluid passage 33.

In the electromagnetically actuated valve of the conventional art, a valve case is connected with other parts by welding. However, it is difficult to check whether or not sealability at the welded connection between the valve case and the other parts is ensured. In contrast, in electromagnetically actuated valve 40 of the first embodiment, the axial end portion of valve case 23 which has protrudent portion 23b is insert-molded in the open axial end portion of outer annular wall 30c. With this construction, sealability between resin member 30 and valve case 23 can be readily ensured.

Further, in electromagnetically actuated valve 40 according to the first embodiment, suction windows 30g are formed in predetermined positions in outer annular wall 30c and filters 30h are integrally disposed in suction windows 30g. With this construction, it is possible to reduce the number of steps for forming suction windows 30g and mounting filters 30h.

Further, in electromagnetically actuated valve 40 according to the first embodiment, contact portion 30b of resin member 30 is formed so as to project from connecting wall 30d toward armature 24. With this construction, it is possible to increase a distance between contact portion 30b and connecting wall 30d as the bottom portion of resin member 30 and thereby reduce influence on contact portion 30b due to deformation at the bottom portion which may be caused when resin member 30 is fixed to housing 26.

Further, in electromagnetically actuated valve 40 according to the first embodiment, outer annular wall 30c of resin member 30 is press-fitted and fixed to valve mounting hole 32 of housing 26. With this construction, it is possible to suppress transmission of a force to contact portion 30b which is applied to outer annular wall 30c by press fitting. In addition, sealability between resin member 30 and housing 26 can be ensured.

Further, in electromagnetically actuated valve 40 according to the first embodiment, press-fit surface 30m of outer annular wall 30c of resin member 30 which is located in the vicinity of connecting wall 30d is press-fitted to the inner circumferential surface of valve mounting hole 32 of housing 26. With this construction, it is possible to increase a distance between press-fit surface 30m and contact portion 30b.

Further, in electromagnetically actuated valve 40 according to the first embodiment, valve case 23 has a wall thickness smaller than a wall thickness of resin member 30. Since electromagnetically actuated valve 40 must be configured to generate a magnetic field between solenoid 21, stationary core 27 and armature 24, valve case 23 disposed between solenoid 21 and armature 24 is made of a non-magnetic material so as to inhibit generation of an undesired magnetic field between other parts. If valve case 23 made of a non-magnetic material has a relatively large wall thickness, there is a possibility that no magnetic field is generated between solenoid 21 and armature 24. For this reason, interruption of the magnetic field between solenoid 21 and armature 24 can be avoided by reducing the wall thickness of valve case 23. Further, since press-fit surface 30m of outer annular wall 30c of resin member 30 which is located in the vicinity of connecting wall 30d is press-fitted to the inner circumferential surface of valve mounting hole 32 of housing 26 and contact portion 30b is brought into contact with plunger 24a, it is desired to provide a high strength of resin member 30. The high strength of resin member 30 can be ensured by increasing the wall thickness of resin member 30.

[Effect]

Electromagnetically actuated valve 40 according to the first embodiment has the following effects.

(1) Electromagnetically actuated valve 40 includes solenoid 21 with coil 22 which generates a magnetic field upon being energized, valve case 23 disposed on the inner circumferential side of coil 22 and made of a non-magnetic material, armature 24 that is moved relative to valve case 23 in an axial direction thereof so as to open and close a fluid passage by the attraction force that is generated upon energizing coil 22, resin member 30 having contact portion 30b that is brought into contact with armature 24 to close orifice 30a of contact portion 30b, and coil spring 28 that always biases armature 24 toward contact portion 30b.

In the above construction of electromagnetically actuated valve 40, the number of steps for forming resin member 30 can be reduced as compared to the number of steps for forming a resin member of the electromagnetically actuated valve of the conventional art which requires multiple steps of the presswork. This results in reducing the number of steps of the manufacturing work of electromagnetically actuated valve 40. Further, since resin member 30 is formed by a single part, provision of sealability is not needed and press-fitting allowance can be omitted to thereby suppress increase in axial length of electromagnetically actuated valve 40. Further, freedom to select a material of resin member 30 can be increased, thereby serving for cost saving.

(2) Resin member 30 is formed into a generally cup shape and includes outer annular wall 30c disposed on an outer circumferential side of contact portion 30b, and connecting wall 30d that connects contact portion 30b and outer annular wall 30c and forms the bottom portion of cup-shaped resin member 30.

By assembling resin member 30 to a desired position relative to valve case 23, the inside space of cup-shaped resin member 30 can be used as fluid passage 33. Therefore, it is possible to omit a work of forming a fluid passage between suction windows 30g and orifice 30a, and thereby suppress the number of steps in the manufacturing work of electromagnetically actuated valve 40. Further, resin member 30 is deformable in a radially outward direction thereof due to high pressure that is generated within the inside space of resin member 30. As a result, sealability of resin member 30 relative to valve mounting hole 32 of housing 26 can be increased.

(3) The axial end portion of valve case 23 which is formed with protrudent portion 23b is insert-molded in the open axial end portion of outer annular wall 30c.

With this construction, sealability between resin member 30 and valve case 23 can be readily ensured, thereby increasing the working efficiency.

(4) Upon molding resin member 30, suction windows 30g are formed in the predetermined positions in outer annular wall 30c of resin member 30 and filters 30h are integrally disposed in suction windows 30g.

With this construction, the number of steps of a formation work of suction windows 30g and a mounting work of filters 30h can be reduced to thereby increase the working efficiency.

(5) Contact portion 30b of resin member 30 is configured to project from connecting wall 30d toward armature 24.

With this configuration, it is possible to increase a distance between contact portion 30b and connecting wall 30d as the bottom portion of resin member 30 and suppress deformation of contact portion 30b which may occur upon press-fitting resin member 30 into valve mounting hole 32 of housing 26.

(6) Outer annular wall 30c of resin member 30 is press-fitted to housing 26 to thereby fix resin member 30 to housing 26.

With this construction, it is possible to suppress transmission of a force which is applied to outer annular wall 30c of resin member 30 upon press-fitting to contact portion 30b, and therefore, prevent contact portion 30b from suffering from deformation due to the force. Further, sealability between resin member 30 and housing 26 can be ensured.

(7) Press-fit surface 30m of outer annular wall 30c of resin member 30 which is located in the vicinity of connecting wall 30d is press-fitted to the inner circumferential surface of valve mounting hole 32 of housing 26.

With this construction, a distance between press-fit surface 30m and contact portion 30b can be increased to thereby suppress deformation of contact portion 30b.

(8) Valve case 23 has the wall thickness smaller than the wall thickness of resin member 30.

By forming valve case 23 so as to have the smaller wall thickness, it is possible to prevent a magnetic field to be generated between armature 24 and solenoid 21 from being interrupted and ensure the attraction force of stationary core 27 which is applied to armature 24. Further, a strength of resin member 30 can be ensured to thereby suppress deformation of resin member 30.

As discussed above, in a case where electromagnetically actuated valve 40 is applied to brake system 20, it is possible to attain downsizing of brake system 20 and ensure the reliability.

Figure 6:
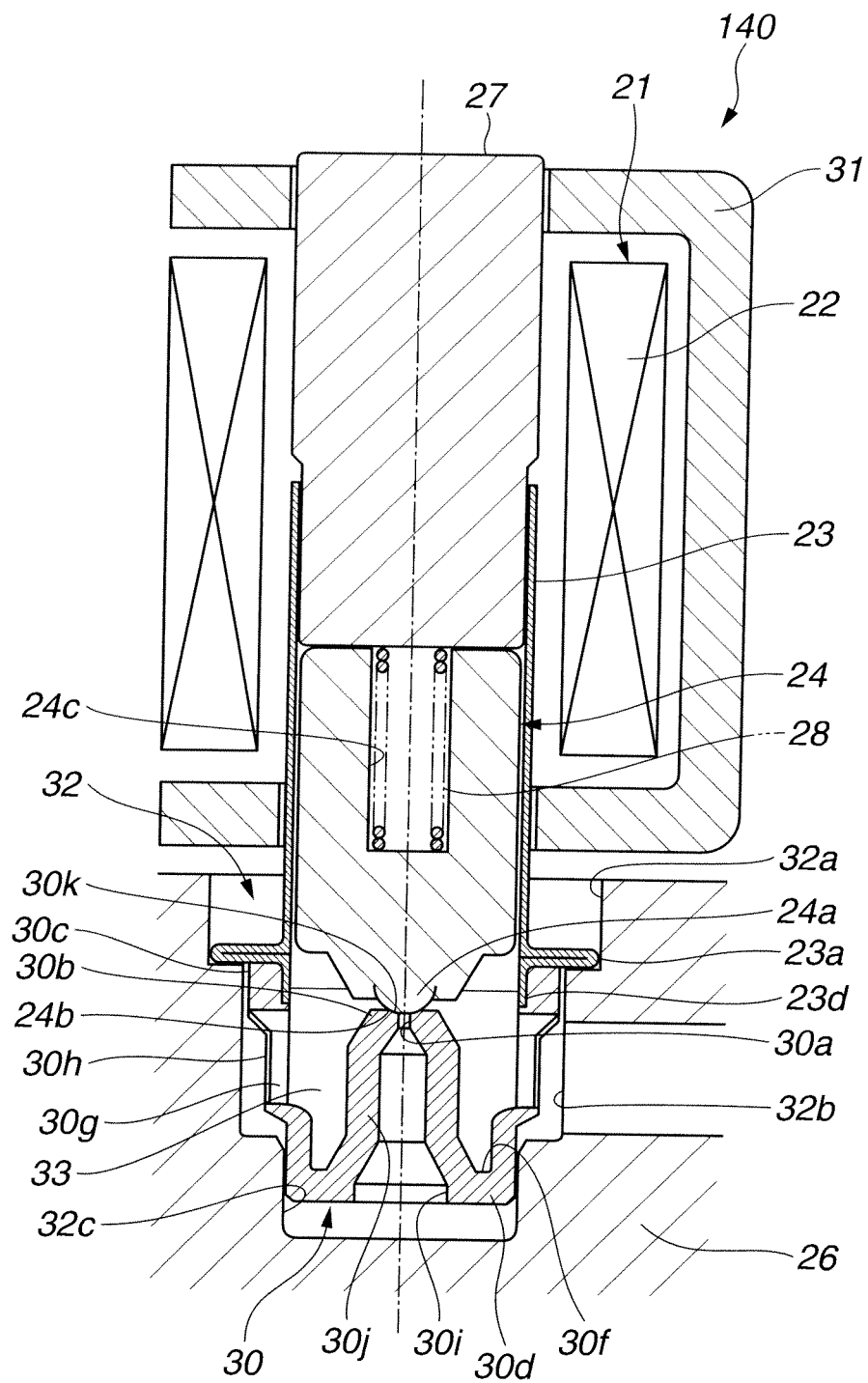
FIG. 6 is a cross section of the electromagnetically actuated valve according to a second embodiment of the present invention, taken along an axis of the electromagnetically actuated valve.

Referring to FIG. 6, an electromagnetically actuated valve according to a second embodiment is explained, which differs in that the valve case is press-fitted to the resin member from the first embodiment in which the valve case is insert-molded in the resin member. Like reference numerals denote like parts, and therefore, detailed explanations therefore are omitted.

[Construction of Electromagnetically Actuated Valve]

FIG. 6 is a cross section taken along an axis of electromagnetically actuated valve 140. As shown in FIG. 6, valve case 23 of electromagnetically actuated valve 140 includes press-fit surface 23d that extends along an outer circumference of the one open end portion of valve case 23. Press-fit surface 23d, i.e., an outer circumferential surface of the one open end portion of valve case 23, is press-fitted into the open axial end portion of outer annular wall 30c of resin member 30.

[Function]

In an electromagnetically actuated valve of the conventional art, a valve case is connected with other part by welding. It is difficult to check whether or not sealability at the welded connection between the valve case and the other part is ensured. For this reason, in electromagnetically actuated valve 140 according to the second embodiment, press-fit surface 23d of the one open end portion of valve case 23 is press-fitted to an inner circumferential surface of the open axial end portion of outer annular wall 30c of resin member 30. With this construction, sealability between resin member 30 and valve case 23 can be readily ensured.

[Effect]

Electromagnetically actuated valve 140 according to the second embodiment has the following effects.

(9) Press-fit surface 23d (i.e., the outer circumferential surface) of the one open end portion of valve case 23 is press-fitted to an inner circumferential surface of the open axial end portion of outer annular wall 30c of resin member 30.

With this construction, it is possible to readily ensure sealability between resin member 30 and valve case 23 and enhance the working efficiency.

Figure 7:
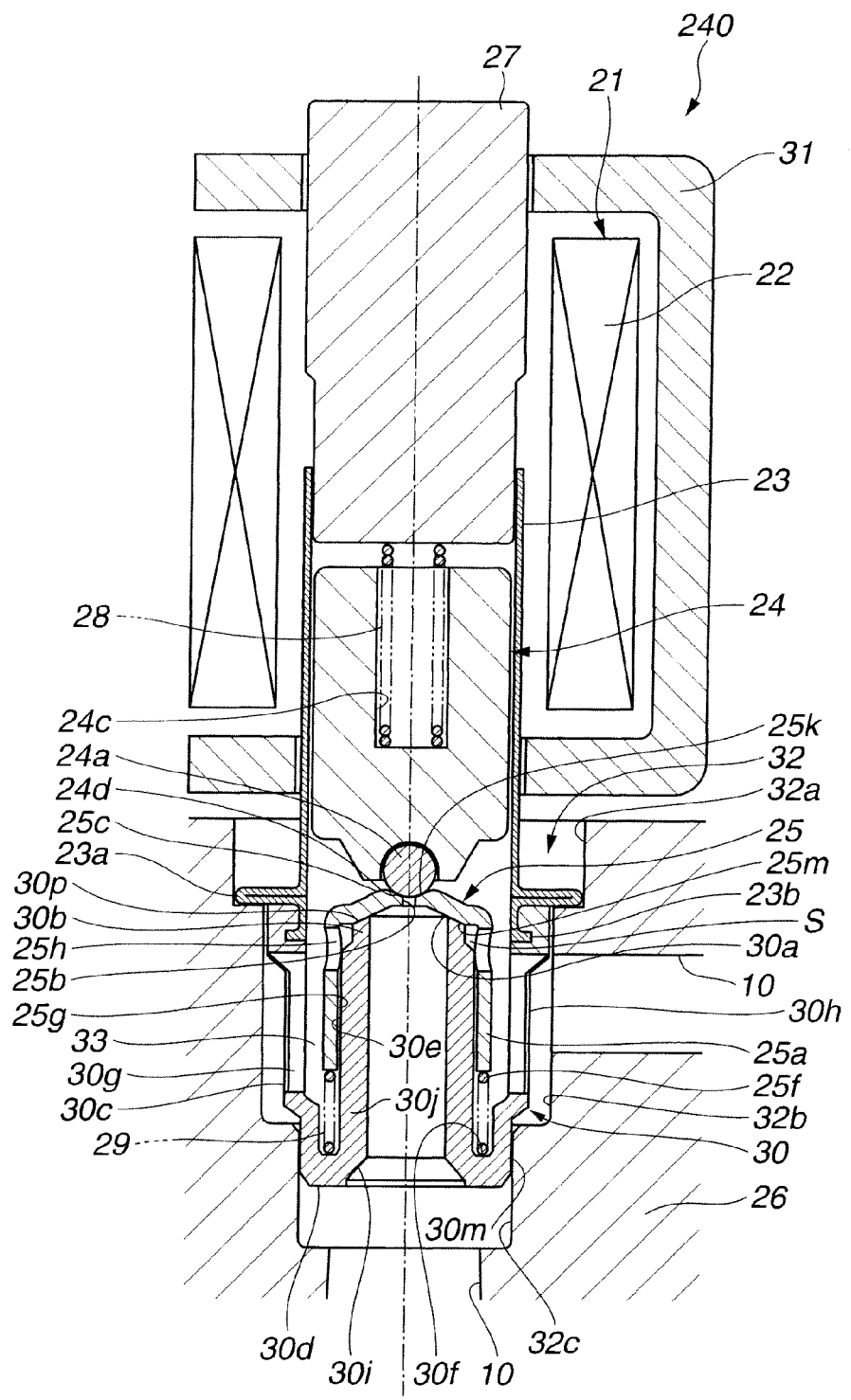
FIG. 7 is a cross section of the electromagnetically actuated valve according to a third embodiment of the present invention, taken along an axis of the electromagnetically actuated valve.

Referring to FIG. 7, an electromagnetically actuated valve according to a third embodiment is explained, which differs in provision of an intermediate member disposed between the armature and the resin member from the first embodiment. Like reference numerals denote like parts, and therefore, detailed explanations therefore are omitted. The electromagnetically actuated valve according to the third embodiment can be used as an inflow gate valve disposed on a fluid passage that extends between the master cylinder and the pump.

FIG. 7 is a cross section of the electromagnetically actuated valve according to the third embodiment. As shown in FIG. 7, electromagnetically actuated valve 240 is mounted to valve mounting hole 32 that is formed in fluid passage 10 within housing 26. Electromagnetically actuated valve 240 includes armature 24 with a spherical or ball-shaped plunger 24a, intermediate member 25 that is disposed between armature 24 and resin member 30, and coil spring 29 that biases intermediate member 25.

Intermediate member 25 is formed into a generally cup shape by presswork which has a bottom portion and a cylindrical side portion with one end that is closed by the bottom portion. Intermediate member 25 is disposed in a reversed state so as to cover contact portion 30b and inner annular wall 30j of resin member 30. Intermediate member 25 includes annular wall 25a that forms the cylindrical side portion of cup-shaped intermediate member 25, and contact portion 25c that forms the bottom portion of cup-shaped intermediate member 25. Contact portion 25c is brought into contact with plunger 24a of armature 24 on one side thereof and brought into contact with contact portion 30b of resin member 30 on an opposite side thereof as explained in detail later. Contact portion 25c serves as a seat portion that is brought into contact with plunger 24a of armature 24. Annular wall 25a has inner circumferential surface 25g and open end 25f that serves as an open end of cup-shaped intermediate member 25. Communication hole 25h is formed in annular wall 25a and communicates an inside and an outside of intermediate member 25. Orifice 25b is formed in contact portion 25c and communicates the inside and the outside of intermediate member 25. First engaging surface 25k is formed on an outer surface of contact portion 25c so as to surround a periphery of orifice 25b. First engaging surface 25k is inclined relative to an axis of intermediate member 25 in such a direction as to be recessed toward orifice 25b. Second engaging surface 25m is formed on an inner surface of contact portion 25c (i.e., on an opposite side of first engaging surface 25k). Second engaging surface 25m is inclined relative to the axis of intermediate member 25 in such a direction as to project from a radial outside of second engaging surface 25m toward a radial inside thereof, i.e., toward orifice 25b.

Orifice 30a formed in resin member 30 has a diameter larger than orifice 25b formed in intermediate member 25. Contact portion 30b of resin member 30 has engaging surface 30p that is inclined relative to the axis of resin member 30 in such a direction as to project from a radial outside of engaging surface 30p toward orifice 30a. Guide portion 30e for guiding intermediate member 25 is formed by an outer circumferential surface of inner annular wall 30j. Annular space S is formed between an outer circumferential surface of contact portion 30b and an inner circumferential surface of annular wall 25a so as to communicate with communication hole 25h. Annular space S serves to facilitate a flow of brake fluid. Fluid passage 33 is formed as an annular space between an outer circumferential surface of annular wall 25a and the inner circumferential surface of outer annular wall 30c of resin member 30.

Coil spring 29 as a second biasing member is disposed between open end 25f of annular wall 25a of intermediate member 25 and bottom surface 30f of connecting wall 30d of resin member 30 and biases intermediate member 25 toward armature 24. Coil spring 29 has a biasing force that acts on intermediate member 25 toward armature 24 which is smaller than the biasing force of coil spring 28 which acts on armature 24 toward intermediate member 25.

Valve mounting hole 32 is a stepped hole and includes larger diameter portion 32a, intermediate diameter portion 32b and smaller diameter portion 32c in the order from a side of the opening of valve mounting hole 32. Fluid passage 10 connected to a side of the master cylinder is opened into a circumferential side surface of intermediate diameter portion 32b of valve mounting hole 32. Fluid passage 10 connected to a side of the pump is opened into a bottom surface of smaller diameter portion 32c of valve mounting hole 32.

[Assembly of Electromagnetically Actuated Valve]

Coil spring 29 is mounted onto the outer circumferential surface of inner annular wall 30j of resin member 30 connected with valve case 23, and then intermediate member 25 is mounted onto the outer circumferential surface of inner annular wall 30j of resin member 30. In this state, coil spring 29 is interposed between open end 25f of annular wall 25a of intermediate member 25 and bottom surface 30f of connecting wall 30d of resin member 30 in a compressed state. Contact portion 30b of resin member 30 is enclosed with annular wall 25a of intermediate member 25. Upon mounting intermediate member 25 onto resin member 30, inner circumferential surface 25g of annular wall 25a is guided by guide portion 30e of resin member 30.

Next, armature 24 is inserted into valve case 23 which is coupled with resin member 30, intermediate member 25 and coil spring 29, from the one end of valve case 23. Coil spring 28 is inserted into spring inserting hole 24c of armature 24. Subsequently, stationary core 27 is inserted into valve case 23 through the other open end of valve case 23, and then secured to valve case 23 by welding. As a result, coil spring 28 is disposed between stationary core 27 and armature 24. Stationary core 27, therefore, is inserted into valve case 23 against a resultant of the biasing forces of coil spring 28 and coil spring 29. That is, coil spring 28 and coil spring 29 are kept in a compressed state under a condition that stationary core 27 has been secured to valve case 23.

The assembled body constituted of valve case 23 with resin member 30, intermediate member 25, coil spring 29, armature 24, coil spring 28 and stationary core 27 is inserted into valve mounting hole 32. At this time, outer annular wall 30c of resin member 30 is press-fitted into smaller diameter portion 32c of valve mounting hole 32. Specifically, press-fit surface 30m of outer annular wall 30c which is located in the vicinity of connecting wall 30d is press-fitted to an inner circumferential surface of smaller diameter portion 32c. In addition, protrudent portion 23a of valve case 23 is brought into contact with a step between larger diameter portion 32a and intermediate diameter portion 32b of valve mounting hole 32. In this state, suction windows 30g of resin member 30 are exposed to intermediate diameter portion 32b, and discharge outlet 30i of resin member 30 is exposed to smaller diameter portion 32c. After that, solenoid 21 is mounted to the assembled body together with yoke 31.

[Operation of Electromagnetically Actuated Valve]

A brake fluid supplied from the master cylinder is supplied to fluid passage 33, i.e., the space between the outer circumferential surface of annular wall 25a of intermediate member 25 and the inner circumferential surface of outer annular wall 30c of resin member 30 through suction windows 30g formed in outer annular wall 30c. In a case where solenoid 21 is in the deenergized state, engaging surface 24d of spherical plunger 24a and first engaging surface 25k of intermediate member 25 are kept in contact with each other so that orifice 25b of intermediate member 25 is held in the closed state. Further, in the deenergized state of solenoid 21, second engaging surface 25m of intermediate member 25 and engaging surface 30p of resin member 30 are kept in contact with each other so that orifice 30a of resin member 30 is held in the closed state. When solenoid 21 is energized, armature 24 is magnetically attracted and moved toward a side of stationary core 27 so that engaging surface 24d of plunger 24a is moved apart from first engaging surface 25k of intermediate member 25 to thereby open orifice 25b of intermediate member 25. At substantially the same time, intermediate member 25 is moved toward the side of stationary core 27 so that second engaging surface 25m of intermediate member 25 is moved apart from engaging surface 30p of resin member 30 to thereby open orifice 30a of resin member 30. As a result, fluid passage 10 is kept in an open condition so that the brake fluid in the master cylinder is supplied to the pump.

[Function]

In electromagnetically actuated valve 240 according to the third embodiment, intermediate member 25 is disposed between contact portion 30b of resin member 30 and plunger 24a of armature 24, and coil spring 29 that acts to bias intermediate member 25 toward armature 24 is provided. Intermediate member 25 is formed with orifice 25b having a flow passage area smaller than that of orifice 30a formed in contact portion 30b. Coil spring 29 has the biasing force smaller than the biasing force of coil spring 28. Owing to the smaller flow passage area of orifice 25b of intermediate member 25 which is brought into contact with plunger 24a, the attraction force that acts on armature 24 so as to magnetically attract armature 24 toward stationary core 27 can be reduced.

Further, in electromagnetically actuated valve 240 according to the third embodiment, contact portion 30b of resin member 30 is configured to project from connecting wall 30d toward armature 24, and intermediate member 25 is disposed so as to cover protrudent contact portion 30b. With this construction, positioning of intermediate member 25 in a radial direction thereof can be attained. Therefore, a sufficient axial length of guide portion 30e of resin member 30 can be ensured.

Further, intermediate member 25 is formed by presswork, and first engaging surface 25k and second engaging surface 25m are provided on opposite sides of contact portion 25c of intermediate member 25. As a result, intermediate member 25 becomes compact in size.

[Effect]

Electromagnetically actuated valve 240 according to the third embodiment has the following effects.

(10) Intermediate member 25 is disposed between contact portion 30b of resin member 30 and armature 24, and coil spring 29 that biases intermediate member 25 toward armature 24 is provided. Intermediate member 25 is formed with a fluid passage (i.e., orifice 25b) having a flow passage area smaller than that of a fluid passage (i.e., orifice 30a) formed in contact portion 30b. Coil spring 29 has the biasing force smaller than that of coil spring 28 which biases armature 24 toward intermediate member 25.

With this construction, the attraction force that acts on armature 24 so as to magnetically attract and move armature 24 toward stationary core 27 can be reduced, and fluid passage 10 can be opened by the reduced attraction force.

(11) Resin member 30 has a cup shape and includes outer annular wall 30c formed on the outer circumferential side of contact portion 30b and connecting wall 30d that connects contact portion 30b and outer annular wall 30c with each other and forms the bottom portion of cup-shaped resin member 30. Further, contact portion 30b is configured to project from connecting wall 30d toward armature 24, and intermediate member 25 is disposed to cover contact portion 30b, and thereby positioned in place in the radial direction thereof.

With this construction, it is possible to ensure a sufficient length of guide portion 30e in the axial direction of resin member 30, and therefore, stably guide intermediate member 25.

This application is based on a prior Japanese Patent Application No. 2009-072350 filed on Mar. 24, 2009. The entire contents of the Japanese Patent Application No. 2009-072350 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electromagnetically actuated valve, comprising:
a solenoid on which a coil is wound;
a tubular member comprising a non-magnetic material, the tubular member being disposed on an inner circumferential side of the coil;
a movable valve body comprising a magnetic material, the movable valve body being movable within the tubular member in an axial direction of the tubular member by an attraction force that is generated upon energizing the coil;
a stationary core secured to the tubular member, the stationary core being disposed on one axial end side of the movable valve body;
a first biasing member disposed between the stationary core and the one axial end side of the movable valve body in a compressed state;
a first member disposed on the other axial end side of the movable valve body and configured to move axially as the movable valve body is moved in the axial direction of the tubular member,
wherein the first member comprises
a first orifice configured to contact the other axial end side of the movable valve body,
a first engaging surface inclined relative to an axis of the first member so as to be recessed toward the first orifice, the first engaging surface being configured to contact a first counterpart engaging surface of the movable valve body, and
a second engaging surface formed on an opposite side of the first engaging surface and inclined relative to the axis of first member so as to project from a radial outside of the second engaging surface toward a radial inside thereof;
a second biasing member that biases the first member toward the movable valve body, the second biasing member having a biasing force smaller than a biasing force of the first biasing member; and
a second member comprising
a second orifice having a diameter larger than a diameter of the first orifice of the first member, and
a second counterpart engaging surface configured to contact the second engaging surface of the first member,
wherein the first member surrounds the second counterpart engaging surface of the second member.

2. The electromagnetically actuated valve as claimed in claim 1, wherein the first member comprises pressed metal.

3. The electromagnetically actuated valve as claimed in claim 1, wherein the first member is generally cup shaped,
wherein the first member is disposed in a reversed state so as to cover the second member,
wherein the first member comprises a bottom portion and a cylindrical side portion, the bottom portion of the first member having an outer surface and an inner surface opposite to the outer surface,
wherein the first orifice is formed in the bottom portion, the first engaging surface is formed on the outer surface of the bottom portion, and the second engaging surface is formed on the inner surface of the bottom portion.

4. The electromagnetically actuated valve as claimed in claim 3, wherein the cylindrical side portion of the first member is formed with a communication hole that communicates an inside and an outside of the first member.

* * * * *